United States Patent [19]

Gramke

[11] Patent Number: 5,437,890
[45] Date of Patent: Aug. 1, 1995

[54] COATINGS FOR RECEPTACLES

[75] Inventor: Mark H. Gramke, Valparaiso, Ind.

[73] Assignee: Edw. C. Levy Co., Detroit, Mich.

[21] Appl. No.: 229,376

[22] Filed: Apr. 18, 1994

[51] Int. Cl.⁶ .............................................. B05D 7/22
[52] U.S. Cl. ................................. 427/236; 106/38.22;
 106/38.9; 106/791; 427/230; 427/318; 427/427;
 427/133
[58] Field of Search ............... 427/236, 230, 133, 318,
 427/427; 106/38.22, 789, 38.9, 791

[56] References Cited

U.S. PATENT DOCUMENTS

| | | | |
|---|---|---|---|
| 2,792,807 | 5/1957 | Cummings | 427/239 |
| 3,243,397 | 3/1966 | Herkimer . | |
| 3,616,108 | 9/1968 | Whitehouse . | |
| 3,752,679 | 8/1973 | Moore | 106/38.35 |
| 3,829,320 | 8/1974 | Stanbridge | 106/84 |
| 3,937,269 | 2/1976 | Salvodore et al. | 106/38.27 |
| 4,113,499 | 9/1978 | Ivanov | 106/38.35 |
| 4,119,468 | 10/1978 | Wiley | 106/38.27 |
| 4,162,238 | 7/1979 | Bergna | 260/29.6 |
| 4,171,984 | 4/1978 | Hosaka et al. | 106/38.3 |
| 4,233,076 | 11/1980 | Blanc et al. | 106/38.35 |
| 4,703,022 | 10/1987 | Johnson | 501/95 |
| 4,895,825 | 1/1990 | Deck et al. | 427/239 |

Primary Examiner—Janyce Bell
Attorney, Agent, or Firm—Harness, Dickey & Pierce

[57] ABSTRACT

The present invention relates to a coating for metallurgical receptacles comprising a slurry of slag fines, lime and water. The coating has proven effective at releasing the skull remaining in metallurgical receptacles after the molten metal has been tapped off and the slag layer has been poured off. The invention also relates to a process for coating metallurgical receptacles with the coating composition of the present invention.

7 Claims, 4 Drawing Sheets

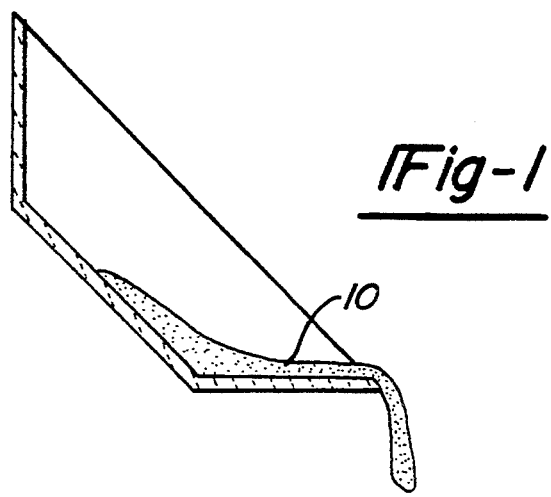
*Fig-1*
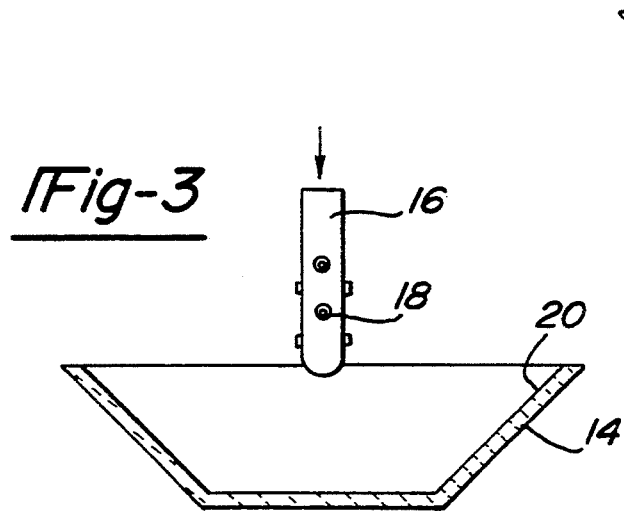
*Fig-2*
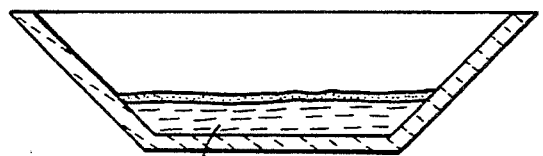
*Fig-3*
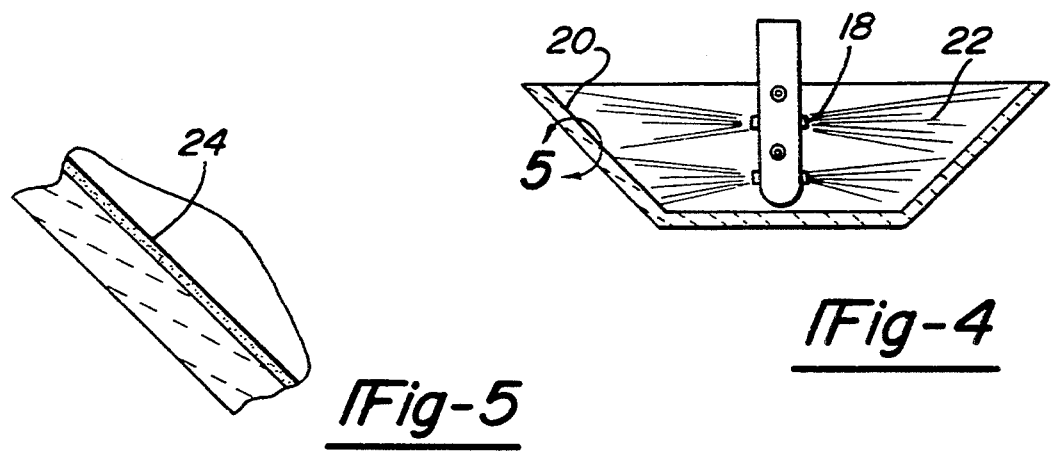
*Fig-5*
*Fig-4*

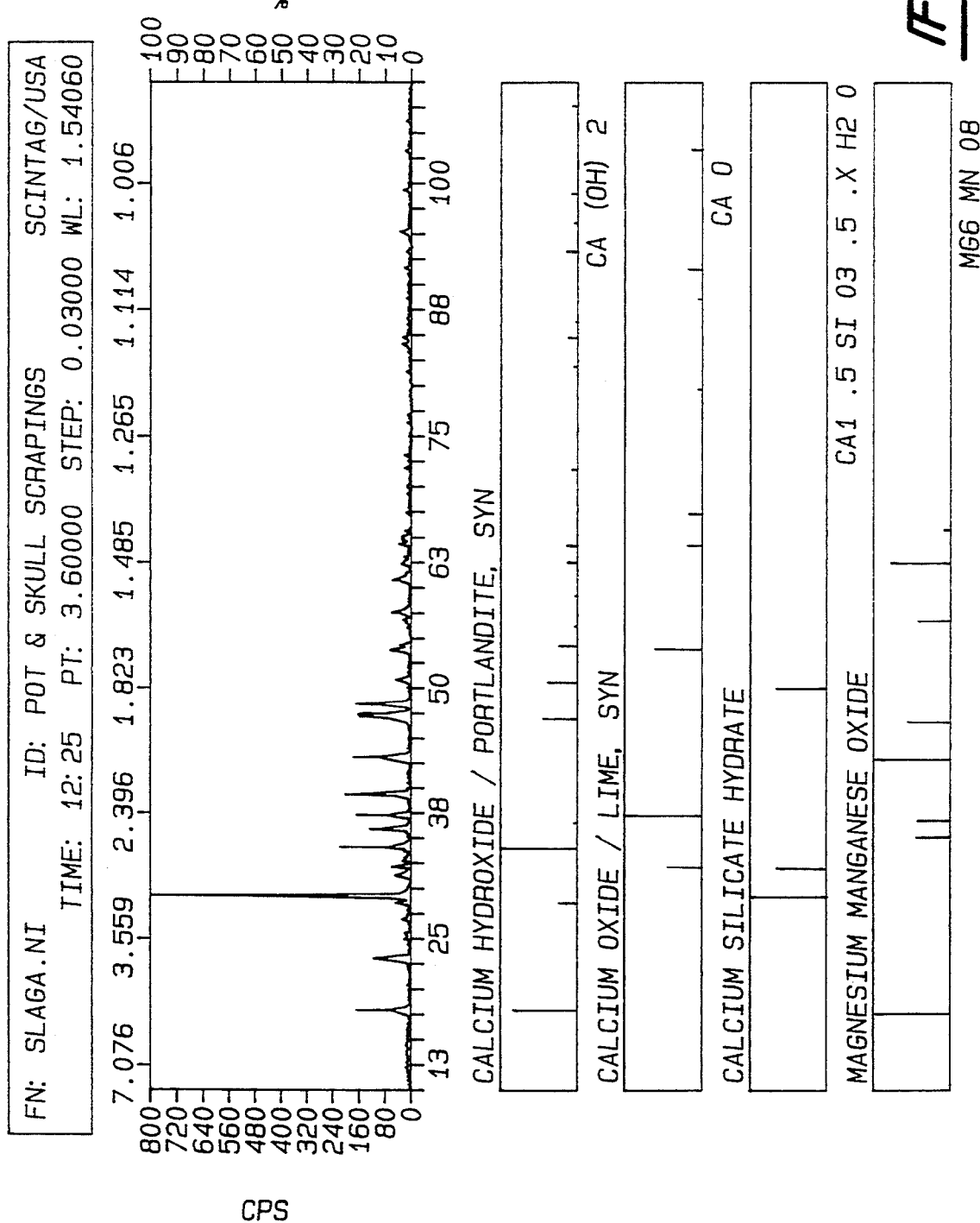

COATINGS FOR RECEPTACLES

BACKGROUND OF THE INVENTION

The present invention relates to compositions and processes for protecting the surface of receptacles having a refractory surface or lining to prevent molten slag and molten metal from adhering to or penetrating the refractory.

Surfaces of receptacles for processing and transporting molten metals such as molds, slag pots, and tundishes are often easily damaged by molten metal and the corresponding molten slag. The damage which results generally occurs because the molten material adheres to the walls of the receptacle and it fails to discharge when the slag layer is poured into a slag receiving pit as is common in the metal processing industry. To loosen the solidified material, or "skull" as it is commonly referred to in the industry, the receptacle has to be repeatedly beaten or otherwise jolted. This repeated abusive treatment of the receptacles leads to excessive deterioration. The same phenomenon applies to molten steel in ingot molds, with adhesion requiring excessive force for the ingot removal and damage to the molds. Further, the molten metal itself can damage the receptacle walls over time.

While the receptacles can be cleaned chemically through the use of acid solutions, such cleaning methods are highly undesirable from an environmental standpoint. Still further repeated use of acid solutions can cause damage to the receptacle walls over time.

In an attempt to solve these problems various compositions have been used to protect the walls of containment vessels from making contact with molten metal and molten slag. For example, U.S. Pat. No. 3,023,119 discloses that combinations of MgO and $Al_2O_3$ are known as coatings for handling molten plutonium. This patent teaches that $CaF_2$ is useful for coating metal or nonmetal receptacles used for molten plutonium. Likewise, U.S. Pat. Nos. 3,035,318 and 3,227,433 disclose the use of $CaF_2$ as a coating to line vessel walls. The use of $Al_2TiO_3$ and $Al_2O_3TiO_3$ as coatings for coating crucibles for molten uranium and uranium alloys is also known according to U.S. Pat. Nos. 3,890,140 and 3,915,695.

The use of such materials to prevent contact between the molten metal and the underlying receptacle material however, usually results in the need to use excessively thick layers due to the tendency of some of these materials to dissolve or react with the molten metal. Any interactions between the coating layer and the molten metal may lead to contamination of the metal.

Still other coatings for receptacles used to contain liquid and molten metals are known. For example, U.S. Pat. No. 4,901,984 which issued Feb. 20, 1990 to Daussen et al., discloses a method for coating a vessel and the coating obtained by the method. The method involves providing a permanent refractory lining on which there is deposited a refractory wearing layer including inorganic particles and a binder. Initially, a layer of silicon resin, which is impenetrable to water, is applied over a permanent refractory lining layer, then the wearing layer which is typically made from inorganic particles and the binder is applied over the water impenetrable layer. All of the layers are then subjected to sufficient drying to remove any water or hydrogen containing compounds.

While, the general concept of coating receptacles for processing molten metals is known in the art, none of the art known to the inventors of the present invention include compositions which utilize slag fines for preparing the coating compositions.

Slag is formed during metallurgical processing as the fused product of oxidized impurities and a fluxing agent added to the molten metal, such as lime. In the steel industry for example, slag is the neutralized product of anhydrous compounds entering into the process. The slag tends to float to the top of the molten metal thus protecting the molten metal from oxidation and impurities such as phosphorous, among others. Eventually the slag is poured off or otherwise removed from the receptacle. Other than some value as a course aggregate in concrete or ballast, until now, slag has had limited commercial value and has merely been considered a by product of the steel processing industry. Typically, the slag fines which are formed during slag processing and screening, are subsequently stockpiled for later disposal via landfilling. Thus, while slag may be useful in construction applications, the slag fines have heretofore been costly to dispose of. It would thus be beneficial to use the slag generated during steel processing, rather than simply landfilling the slag.

SUMMARY OF THE INVENTION

According to the teachings of the present invention, slag fines, consisting mainly of calcium and magnesium oxides and silicates, are mixed with lime and water to form a slurry which can be applied to the walls of empty receptacles to protect the receptacle walls from adhesion with the molten matter.

The resulting protective layer generally has a melting point in excess of 1400° C. and is applied to the receptacle walls which are maintained at a temperature of between about 400°–800° C. After application and upon the introduction of molten material into the receptacle the protective layer undergoes an endothermic reaction, whereby it absorbs sensible heat from the molten matter and at the same time cools the surface of the molten material which is contacted by the layer. The ability of the resulting layer to approach the reaction temperature or remain below the solidification temperature of the molten matter results in the formation of a protective coating along the receptacle walls.

It is therefore a primary object of the present invention to provide a receptacle coating which protects receptacle walls from deterioration.

It is another object of the present invention to utilize the slag fines produced during steel forming processes to reduce landfilling of the slag fines.

It is yet another object of the present invention to provide a relatively inexpensive coating composition for metallurgical receptacles.

Still another object of the present invention is to reduce operating expenses in the steel processing industry by prolonging the useful life of metal processing receptacles.

BRIEF DESCRIPTION OF THE DRAWINGS

Further objects, advantages and features of the present invention will become more apparent by full consideration of the detailed description of the present invention, set forth below, taken in conjunction with the drawings and the accompanying claims, in which:

FIG. 1 is a side elevational view of a metallurgical receptacle wherein the slag layer is being poured off;

FIG. 2 is a side elevational view of a metallurgical receptacle wherein the molten metal is being tapped;

FIG. 3 is a side elevational view of a spraying system being introduced into the cavity of an empty metallurgical receptacle;

FIG. 4 is a side elevational view of the spraying system applying the coating composition of the present invention to the walls of the metallurgical receptacle; and FIG. 5 is a broken away view of the metallurgical receptacle of FIG. 4 shown with the resulting coating layer.

FIG. 8 is a chart illustrating the results for x-ray diffraction for x-ray diffraction for a slurry sample.

DETAILED DESCRIPTION OF THE PREFERRED EMBODIMENTS

Figure 6:
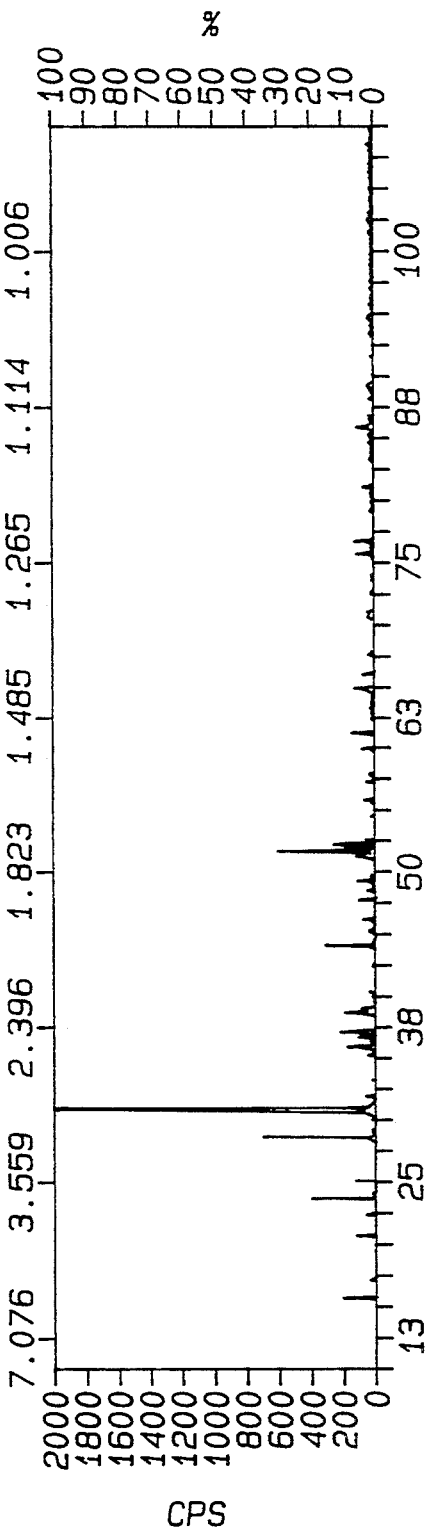
FIG. 6 is a chart illustrating the results of x-ray diffraction analysis of slag fines of calcium magnesium silicate.

As previously noted slag fines are generated as a by product of the slag processing industry. According to X-Ray Fluorescence and X-Ray Diffraction analysis of sample blast furnace slag fines, the slag fines generally have a chemical content including, but not limited to oxides, hydroxides and silicates of calcium, silicon, magnesium, aluminum, sulfur, iron, manganese, titanium, potassium, strontium, barium, sodium and zinc. For example, as illustrated in the chart of FIG. 6, the results of an X-Ray diffraction analysis of slag fines for calcium magnesium silicate using a Scintag X-Ray diffraction spectrometer are presented. Further, an elemental analysis using an X-Ray fluorescence spectrometer are presented in Table I.

Figure 7:
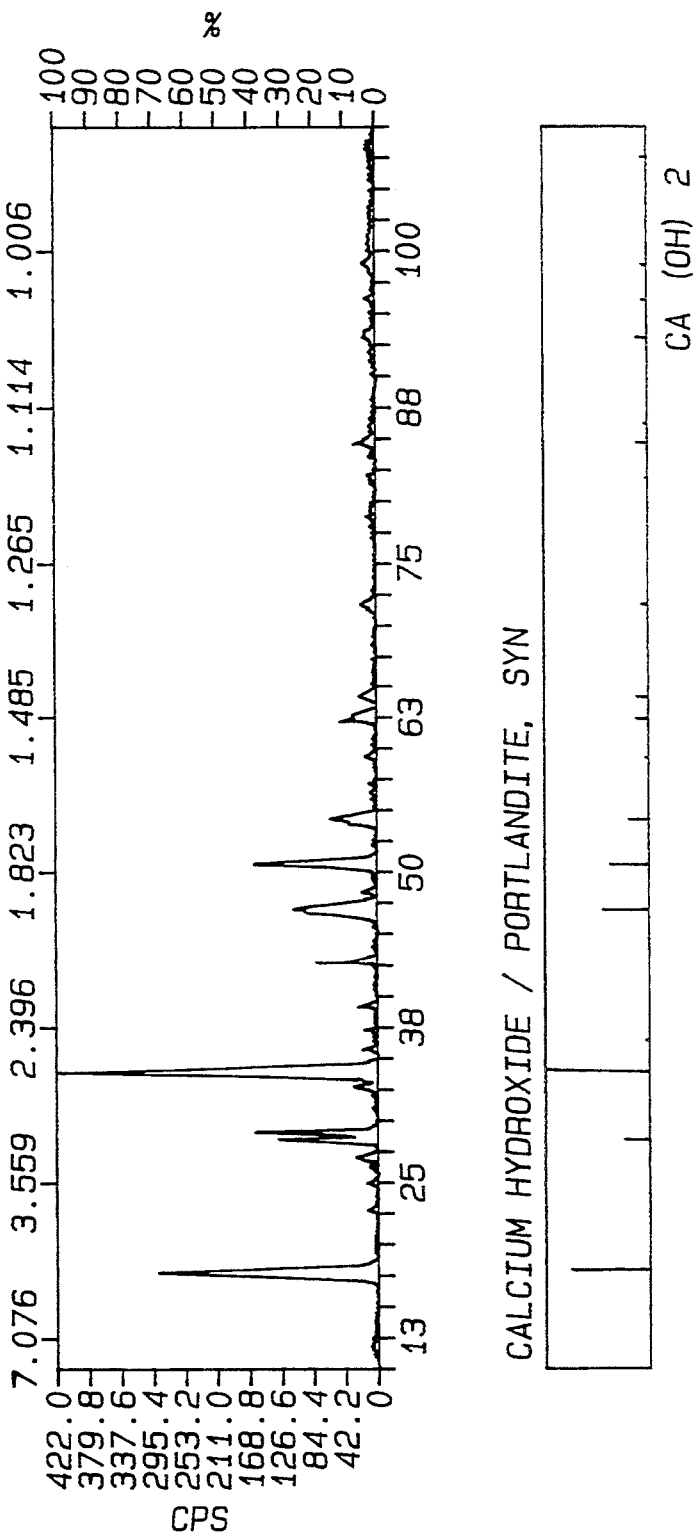
FIG. 7 is a chart illustrating the results for x-ray diffraction for calcium hydroxide.

Similarly, a sample of lime collected from lime screening was analyzed using a Scintag X-Ray diffraction spectrometer for its chemical content, namely calcium hydroxide, as shown in the chart of FIG. 7. The lime sampling was also analyzed for elemental content using an X-Ray fluorescence spectrometer. As a result of the elemental analysis it was discovered that the sample included calcium, silicon, magnesium, aluminum, sulfur, iron, manganese and strontium with the largest percentage being calcium. The percentages of each element contained in the sample are set forth in Table I below.

Further, a slurry sample prepared according to the procedures set forth herein was also analyzed for calcium oxide, calcium silicate hydrate and magnesium manganese oxide using a Scintag X-Ray diffraction spectrometer, with the results being noted in the chart of FIG. 8. Additionally, an elemental analysis using an X-Ray fluorescence spectrometer was conducted, with the results being listed in Table I.

TABLE I

| Elements | SAMPLES ANALYSIS | | |
|---|---|---|---|
| | Slag Fines | Lime Fines | Slurry |
| Ca | 36.9 | 93.3 | 73.0 |
| Si | 34.9 | 4.10 | 13.5 |
| Mg | 12.4 | 1.17 | 6.80 |
| Al | 9.30 | 0.660 | 3.27 |
| S | 3.56 | 0.128 | 1.77 |
| Fe | 0.789 | 0.563 | 0.657 |
| Mn | 0.712 | 0.057 | 0.448 |
| Ti | 0.447 | — | 0.251 |
| K | 0.579 | — | 0.239 |

TABLE I-continued

| Elements | SAMPLES ANALYSIS | | |
|---|---|---|---|
| | Slag Fines | Lime Fines | Slurry |
| Sr | 0.046 | 0.043 | 0.069 |
| Zr | 0.055 | — | 0.057 |
| Na | 0.214 | — | — |
| Ba | 0.092 | — | — |
| | 100 | 100 | 100 |

Although the constituents are listed as occurring in their elemental states, it should be noted by those skilled in the art that the elements actually occur in a variety of forms such as oxides, hydroxides, and silicates, among others.

The lime used according to the teachings of the present invention is available from a number of sources including processed lime which has been pulverized and screen filtered for use in the steel processing industry.

Both the slag fines and lime which are typically pre-pulverized, are generally delivered to the mixing area in large quantities (i.e. tons). The composition is formed by transporting select quantities of the slag fines and lime to a mixing tank using screw conveyor type systems. Typically the mixing tanks are large stainless steel drums having the capacity to hold relatively large quantities of the chemical composition. Mixing tanks having an average diameter of 1.2 m and a height of 2.4 m with a capacity of 2700 liters have proven to be useful.

Using a timer based on volumetric flow, the constituents are added to the mixing tank in the following manner. Initially, the slag fines and lime are added to the mixing tank in the presence of water in substantially equal proportions. On a weight percentage basis the typical ratios of slag fines to lime fines are from between about 0.8 to about 1.2 kg of slag fines for every 0.8 to about 1.2 kgs of lime fines. In addition, a total of between about 2.6 to about 3.9 kgs of water are added to the slag and lime mixture to form a slurry. By substantially equal proportions, it is meant that the weight of slag fines and lime differ by no more than 0.4 kgs based on a total composition weight of between about 4.2 kgs to about 6.3 kgs. It is important to recognize that lesser or greater quantities of the composition can be formulated as desired provided that the composition has a constituency ratio of slag fines to lime to water of approximately 1:1:3.3. A valve mechanism is used to trigger the flow of the constituents into the tank whenever the height of the slurry falls more than 0.35 meters within the tank. In the event that the slurry has fallen to a level of below about 0.35 meters the slag chute is open for approximately 2.5 minutes and the lime chute for approximately 3 minutes, both chutes being substantially equally angled. This results in an overall volumetric flow of relatively equal proportions of slag fines to lime on a weight percentage basis. As the slag fines and lime are added to the water contained in the mixing tanks, the composition is thoroughly mixed using a plurality of spaced agitators of different lengths. Using agitators of varying lengths enables mixing at the top and bottom of the tank, which is highly important when the outlet flow is located at the bottom of the tank.

The resulting composition is applied to the receptacle in the following manner. After pouring off the slag 10 as shown in FIG. 1, the empty receptacle 14 is positioned underneath the spray station 16 as shown in FIG. 3. Once positioned, the spray station is activated by remote control or sensors (not shown) thus causing the spray nozzle 18 to drop vertically into the receptacle 14. The composition 22 is sprayed through a multi-spray nozzle 18 as it retraces its vertical path, thereby coating the receptacle walls 20 as shown in FIG. 4. Preferably, the receptacle walls 20 will be at a temperature of between 400°–800° C. when the coating composition is applied to drive off the water leaving behind the coating layer 24 shown in FIG. 5. The metallurgical receptacle 14 is heated by the previous amount of molten metal and molten slag that it is in contact with.

The total spraying time is generally 30 seconds or less and the quantity sprayed is approximately 60 liters for a receptacle having a volume capacity of between about 600 to about 1100 ft³. Ideally, a backup system substantially identical to the one described is in place at the facility to eliminate delays in the process during maintenance of the primary system.

The general chemical reaction which occurs along the receptacle walls is:

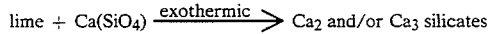

Upon introducing molten material into the receptacle the coating layer undergoes an endothermic reaction whereby the coating layer absorbs heat from the molten matter and simultaneously cools the molten matter which is in contact with the coating layer.

As a result of using the coating composition taught by the present invention it has been found that the skull remaining after slag is removed from the receptacle tends to release readily from the receptacle, thus eliminating the need to jar it loose. This in turn prolongs the useful life of the metallurgical receptacle.

While it will be apparent that the preferred embodiments of the invention disclosed are well calculated to fulfill the objects stated, it will be appreciated that the invention is susceptible to modification, variation and change without departing from the spirit thereof.

What is claimed is:

1. A composition for coating receptacles used for containing molten metal comprising a mixture of slag fines, lime and water to form a slurry, wherein the ratio of each constituent on a weight basis include from between about 0.8 to about 1.2 kg of slag fines; from between about 0.8 to about 1.2 kg of lime and from between about 2.6 to about 3.9 kg of water, based on a total weight of between 4.2 kg to about 6.3 kg for the composition.

2. The composition of claim 1, wherein the ratio of slag fines to lime to water is approximately 1:1:3.3 based on weight.

3. A process of coating receptacles used for containing molten metals, said process comprising the steps of:
    (a) mixing a slurry comprising slag fines, lime and water, wherein the ratio of each constituent on a weight basis include from between about 0.8 to about 1.2 kg of slag fines; from between about 0.8 to about 1.2 kg of lime and from between about 2.6 to about 3.9 kg of water, based on a total weight of between 4.2 kg to about 6.3 kg for the slurry;
    (b) heating a receptacle for receiving molten metal to a temperature of between about 400° to about 800° C.; and
    (c) applying the slurry of step (a) to the heated receptacle walls.

4. The process of claim 3, wherein said step of heating the receptacle is accomplished by introducing molten metal into the receptacle and subsequently emptying the receptacle.

5. The process of claim 3, wherein said step of applying the slurry is accomplished by spraying the slurry composition on to the receptacle walls.

6. A composition for coating receptacles used for containing molten metal comprising a mixture of slag fines, lime and water to form a slurry, said slag fines and lime being present in proportions which vary by no more than 0.4 kg based on a total composition weight of between about 4.2 kg to about 6.3 kg, with a water constituency of at least 2.6 kgs being present upon formation of the slurry.

7. The composition of claim 6, wherein the ratio of each constituent on a weight basis include from between about 0.8 kg to about 1.2 kg of slag fines; from between about 0.8 kg to about 1.2 kg of lime and from between about 2.5 kg to about 3.9 kg of water.

* * * * *

UNITED STATES PATENT AND TRADEMARK OFFICE
CERTIFICATE OF CORRECTION

PATENT NO. : 5,437,890
DATED : August 1, 1995
INVENTOR(S) : Mark H. Gramke

It is certified that error appears in the above-indentified patent and that said Letters Patent is hereby corrected as shown below:

Column 3, line 19, delete "for x-ray diffraction"(second occurrence), and insert --analysis--.

Signed and Sealed this

Twenty-eighth Day of May, 1996

Attest:

BRUCE LEHMAN

*Attesting Officer*      *Commissioner of Patents and Trademarks*